Sept. 27, 1960 F. H. BRAY ET AL 2,954,438

AUTOMATIC TELECOMMUNICATION EXCHANGE EQUIPMENT

Filed Feb. 4, 1957

Inventor
F. H. BRAY –
R.G. KNIGHT
By [signature]
Attorney 2,954,438

AUTOMATIC TELECOMMUNICATION EXCHANGE EQUIPMENT

Frederick Harry Bray and Ronald George Knight, London, England, assignors to International Standard Electric Corporation, New York, N.Y.

Filed Feb. 4, 1957, Ser. No. 638,088

Claims priority, application Great Britain Feb. 9, 1956

3 Claims. (Cl. 179—18)

The present invention relates to a subscriber's line circuit such as is used in automatic telecommunication exchanges.

According to the present invention there is provided a subscriber's line circuit such as is used in an automatic telecommunication exchange system in which a single relay serves both as a calling relay and as a ring-trip relay.

The invention will now be described with reference to the accompanying drawings, in which.

Figures 1, 2:
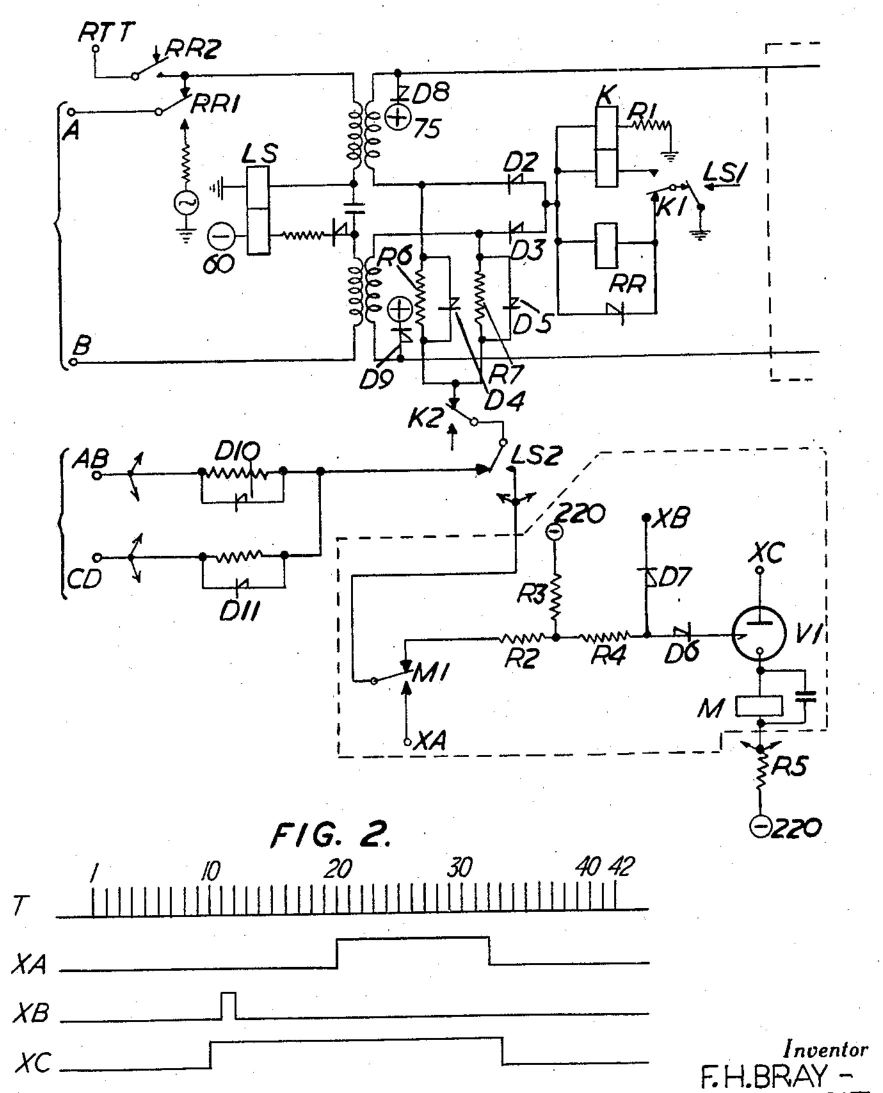
Fig. 1 shows an embodiment of the invention.
Fig. 2 is a diagram of the waveforms of certain pulse trains used in the circuit of Fig. 1.

(*a*) *Calling subscriber.*—When the subscriber whose line circuit is shown in the accompanying drawing lifts his receiver to initiate a call, the line relay LS is operated in the loop. As a result of this, earth potential is applied via resistor R1, the upper winding of relay K, rectifiers D2—D4 and D3—D5 in parallel, change-over contact K2 back and change-over contact LS2, operated, to a circuit known as a calling line marker. This circuit, which is shown within the broken line box, is assumed to be common to a group of 50 lines having the same tens and units digit combination. Like the whole of the telephone exchange for which the circuit shown in the drawing was developed, this circuit is controlled by timed pulses. The basic time pulse cycle consists of 42 milliseconds (T-0–T41 inclusive), and the pulses used in the circuit shown are:

Pulse XA extends from T20 to T32 of the cycle, its "no-pulse" level being earth and its "pulse" level being +130 volts.

Pulse XB extends from T11 to T12 of the cycle, its "no pulse" level being —220 volts and its "pulse" level being —110 volts.

Pulse XC extends from T10 to T33 of the cycle, its "no pulse" level being —110 volts and its "pulse" level being earth.

The actual system for which the circuit shown was intended is the electronic telephone exchange system described in full in our co-pending application Serial No. 536,963, filed September 27, 1955, now Pat. No. 2,872,527.

To return to the operation, due to the changeover of LS2, this earth potential is applied via a changeover M1 back to one end of a bleeder R2—R3, the other end of which is connected to —220 volts. The centre tap of the bleeder is connected via resistor R4 and rectifier D6 to the trigger electrode of the tube V1 in the calling line marker. This trigger electrode is normally maintained at —220 volts, which is the normal level of XB, via D7 and D6 in series. At T10 of the cycle, XC rises to earth, which is not alone adequate to fire V1, and at T11 XB rises to —110 volts. If the earth already mentioned is present, the centre tap of R2—R3 will be at about —100 volts at this time, and this fires V1. However, if LS2 has not changed over, the centre-tap of R2—R3 is at —220 volts and V1 does not fire.

When V1 fires, current flows in its cathode circuit through relay M and resistor R5. R5 is a lock-out resistor common to all tubes, such as V1, in the exchange and ensures that only one such tube can fire at a time. The current flow now operates relay M. The trigger electrode of V1 is only primed by XB from T11—T12 so that relay M cannot operate during the positive marking condition from T20–T32.

The change-over of contact M1 causes pulse XA (T20–T32, earth to 130 volts) to be applied to all the line circuits served by the calling line marker whose M relay has operated. The calling line circuit has its relay LS operated, so this condition is applied over M1, LS2, R6 and R7 and the transformer windings to the talking wires. From here it is applied to an inlet to an electronic switch serving the subscriber whose line circuit is shown. The rectifiers D8 and D9, shown, serve to catch the talking wires, and hence the voltage applied to the inlet, at +75 volts. The relatively high pulse voltage ensures that a rapid rise time is obtained, while rectifiers D4 and D5 already mentioned act as current drains for pick-up pulses which might otherwise cause spurious operation.

The outlets from the subscriber's electronic switch are now sequentially pulsed by short pulses occurring within T20–T32, and when a free outlet is pulsed the electronic switch connects that outlet and the calling line. This causes current flow from XA, which causes the marking pulse voltage to be dissipated across resistors R6 and R7. This disables the marking condition, preventing multiple seizure. Current now flows from earth via R1, K, D2–D3, the connection through the switch to a control relay (not shown) in the seized outlet, and —170 volts. Relay K and the control relay thereupon operate in series and at K1 locks itself to LS1, and at K2 disconnects the calling line from the calling line marker.

With K operated, as just described, the condition between inlet and outlet of the switch are such that a further relay in the outlet operates, causing a free register to be seized, which sends dial tone to the caller. The latter now dials the required number and relay LS responds to the dial impulses. When LS releases on each impulse, the lower low resistance winding of relay K is connected in parallel with the upper winding of that relay. Hence the current flowing therein is increased. This has the effect of reducing the current flowing in the further relay, which thus releases and passes the impulse thereby to the register. On re-operation of LS at the end of the impulse, the lower winding of relay K is open circuited, current falls in the circuit shown and the further relay re-operates. This is repeated for subsequent impulses.

The switch is assumed to consist of an assembly of tubes such as described in U.S. Patent No. 2,775,722, in which one anode of a tube is connected to an inlet wire and one to an outlet wire. When the tube is conducting, an increase in current flowing from one anode to the cathodes reduces the current in the other anode-cathode gap. This provides a substantially noise free anode-anode-transmission path.

(*b*) *Called subscriber.*—In the system in which the circuit shown in the accompanying drawing is used, when a wanted number has been stored in the register it is transferred to a called line marker serving the whole exchange.

This marks an AB lead corresponding to the thousands/hundreds digit combination of the wanted line (there being 100 such leads) and a CD lead corresponding to the tens/units digit combination of the wanted line (there being 100 such leads). Each of these leads extends to all line circuits to which it applies, and each line circuit is uniquely characterised by one combination of such leads.

When both AB and CD leads of the line circuit are marked, and only then, a positive condition is applied via the rectifiers D10 and D11, contacts LS2 and K2, D4—D2 and D5—D3 to the speech wires. From here it is connected to the anodes of the tubes of the called subscriber's individual switch. If only one of the AB and CD leads be energised, the positive condition is drained off via the other lead. The outlets of the switch via which calls reach the line circuit are pulsed (at different times to the pulsing for calling lines) and when a free outlet via which the line is accessible is found, one pair of gas tubes conducts. The current so produced flows from earth via LS1 back, K1 back, relay RR and rectifiers D2 and D3, so relay RR operates, in this circuit. The ringing generator is connected to the A wire over contact RR1, now changed over, the subscribers having earthed bells connected to the positive wires. At the same time, ring tone is applied from RTT via RR2 changed over, and is reverted over the speech path to the caller.

When the called subscriber replies, the line relay LS, already mentioned, operates in the loop in series with the ringing generator and at its contact LS1 removes earth from relay RR, which releases slowly due to the rectifier in shunt therewith. Thus LS acts both as the calling line relay and as the ring trip relay. The release of RR disconnects ringing current and tones. This is to give relay K time to operate in the circuit from R1 to the tube anodes, so that this relay can operate before relay RR has fully released. This causes the flick of relay LS during the transit time of RR1, which might otherwise cause a spurious release of the call.

(*c*) *Release* is effected by removing the supply voltage from the tube cathodes.

When the caller releases, relay LS releases, which causes, via the switch, release of subsequent switching stages.

While the principles of the invention have been described above in connection with specific embodiments, and particular modifications thereof, it is to be clearly understood that this description is made only by way of example and not as a limitation on the scope of the invention.

What is claimed is:

1. A subscriber's line circuit for an automatic telephone exchange system comprising a relay, a first operating circuit for said relay including the subscriber's line loop, whereby said relay serves as a calling relay, a source of ringing current, means in said line circuit responsive to an incoming call to that line circuit only from a line other than that of said line circuit for connecting ringing current to said subscriber's loop from said source and interrupting said first operating circuit of said relay, said connecting means providing a second operating circuit for said relay including said source of ringing current when said subscriber's loop is closed, and means controlled by the operation of said relay for rendering said connecting means inoperative and restoring said first operating circuit for said relay, whereby said relay serves as a ring-trip relay.

2. A subscriber's line circuit, as defined in claim 1, in which the first operating circuit for the relay includes the direct current feed for the subscriber's loop.

3. A subscriber's line circuit, as defined in claim 2, in which the relay has two windings and the first operating circuit for the relay comprises a transformer having two pairs of windings, the adjoining ends of one pair of windings being connected respectively to said two relay windings and the other ends of said one pair of windings being connected to the subscriber's line loop, one of the wires of said line loop including a change-over contact forming the connecting means, whereby said relay will respond when the line is looped in making a call, said source of ringing current being connected to said change-over contact to connect ringing current to said one line wire when said contact is changed over, the means responsive to an incoming call including means for operating said change-over contact to connect ringing current to said line and disconnect said one wire from said transformer winding, whereby when said subscriber's loop is closed by the called subscriber answering, one winding of said relay is energized through the ringing current source and said relay operates.

No references cited.